United States Patent [19]
Allison

[11] Patent Number: 5,668,788
[45] Date of Patent: Sep. 16, 1997

[54] PROGRAMMED JUKE BOX CAPABLE OF CALCULATING A CONTINUOUS UPDATED PLAYLIST

[76] Inventor: Avery Vince Allison, 355 Hazel Green Dr., Wetumpka, Ala. 36092

[21] Appl. No.: 660,851

[22] Filed: Jun. 10, 1996

[51] Int. Cl.$^6$ ................................................ G11B 17/22
[52] U.S. Cl. .................................. 369/30; 369/34
[58] Field of Search .......................... 369/30, 33, 34, 369/35, 36, 37, 38, 39, 178, 180, 32

[56] References Cited

U.S. PATENT DOCUMENTS

| | | | |
|---|---|---|---|
| 4,073,586 | 2/1978 | Ishikawa | 358/342 |
| 4,210,785 | 7/1980 | Huber | 179/100.1 |
| 4,210,940 | 7/1980 | Prysby | 360/33 |
| 5,168,481 | 12/1992 | Culbertson | 369/2 |
| 5,228,015 | 7/1993 | Arbiter et al. | 369/34 |
| 5,235,572 | 8/1993 | Tamai | 369/30 |
| 5,253,234 | 10/1993 | Ogawa et al. | 369/30 |
| 5,375,106 | 12/1994 | Kawachi | 369/32 |
| 5,415,319 | 5/1995 | Risolia | 221/3 |
| 5,418,763 | 5/1995 | Ichikawa et al. | 369/30 |
| 5,440,637 | 8/1995 | Vanfleet | 369/30 |
| 5,467,326 | 11/1995 | Miyashita | 369/30 |

FOREIGN PATENT DOCUMENTS

| | | | |
|---|---|---|---|
| 58-163062 | 9/1983 | Japan | 369/30 |
| 291795 | 3/1990 | Japan | 369/30 |
| 3296193 | 12/1991 | Japan | 369/30 |

*Primary Examiner*—Tan Dinh
*Attorney, Agent, or Firm*—Alvin S. Blum

[57] ABSTRACT

A system for playing performances recorded on disc, tape and records includes video display terminals with touch panel control for audience selection of particular performances to be played. The terminals display not only lists of performances but also the graphics and text on the album covers or disc jackets to enhance the selection process. A computer controller controls the apparatus that stores the recordings, selects, manipulates and plays the various performances selected at the terminals. The controller makes up the playlist based on the popularity of each performance as indicated by choices registered at the terminals, with a preset time interval delay before any performance can be repeated. When not used for selecting, the terminals may display advertisements, games and the like.

4 Claims, 2 Drawing Sheets

PROGRAMMED JUKE BOX CAPABLE OF CALCULATING A CONTINUOUS UPDATED PLAYLIST

BACKGROUND OF THE INVENTION

1. Field of the Invention

The present invention relates to apparatus for playing recorded media having many titles and more particularly to a system allowing the audience to select titles to be played on the basis of their popularity and time since last playing.

2. Description of the Related Art

Juke boxes in public gathering places will play musical numbers from records, discs, or tapes. The particular musical selections played will be heavily weighted to a few of the most popular numbers. This will soon become annoying to most of the listening audience. Some establishments employ a disc jockey to make the selections. Others employ some preselected sequence of automatic play such as disclosed in U.S. Pat. No. 4,210,940 issued Jul. 1, 1980 to Prysby and U.S. Pat. No. 5,168,481 issued Dec. 1, 1992 to Culbertson. These methods are arbitrary and may not reflect the preferences of the listening audience at the time. It would be useful to have a playing system that enables the listening audience to vote on what they are to hear without overwhelming them with excessive repetition of favorites. Most current recordings such as compact discs provide, on their outer coverings, details of each performance along with an elegant graphic image. It would be useful for the selecting audience to have access to that outer covering image and data when making their selections.

SUMMARY OF THE INVENTION

It is accordingly an object of the invention to provide a system for playing recorded audio information that provides a video information display related to each of the recorded items or menu for the audience's selection. It is another object that the system record each selection and arrange a sequence of pieces to be played based on the popularity, with the pieces receiving the greatest number of votes getting the earliest priority. Provision is made for preventing replay of a piece within a preset time interval.

The system of the invention includes a plurality of video display terminals which serve the menu and selection devices. The recorded pieces may be stored on suitable recording media well known in the art such as vinyl records, magnetic tape, compact optically read discs and the like with recording media selection and playback apparatus. Each of the terminals provides a video display representing each recorded piece together with text indicating title, performers and the like. A member of the audience can view the entire menu of available pieces by actuating controls on the terminal and can register pieces selected such as by a touch panel mechanism for ease of use, even indicating priority of the selections. The terminals are interconnected to the central control and playback apparatus. The central control may include a computer, memory, and programs for controlling operation of the playback apparatus. The central control collects all the selections and performs calculations thereon to prepare a continuously adjusted priority list of selections while delaying replaying of any piece until after a preset delay time interval.

The display terminal may also optionally display announcements, advertisements, games and the like to add further value to the system.

These and other objects, advantages and features of the invention will become more apparent when the description is considered in conjunction with the drawings in which like characters refer to like elements in the various figures.

DETAILED DESCRIPTION OF PREFERRED EMBODIMENT

Figure 1:
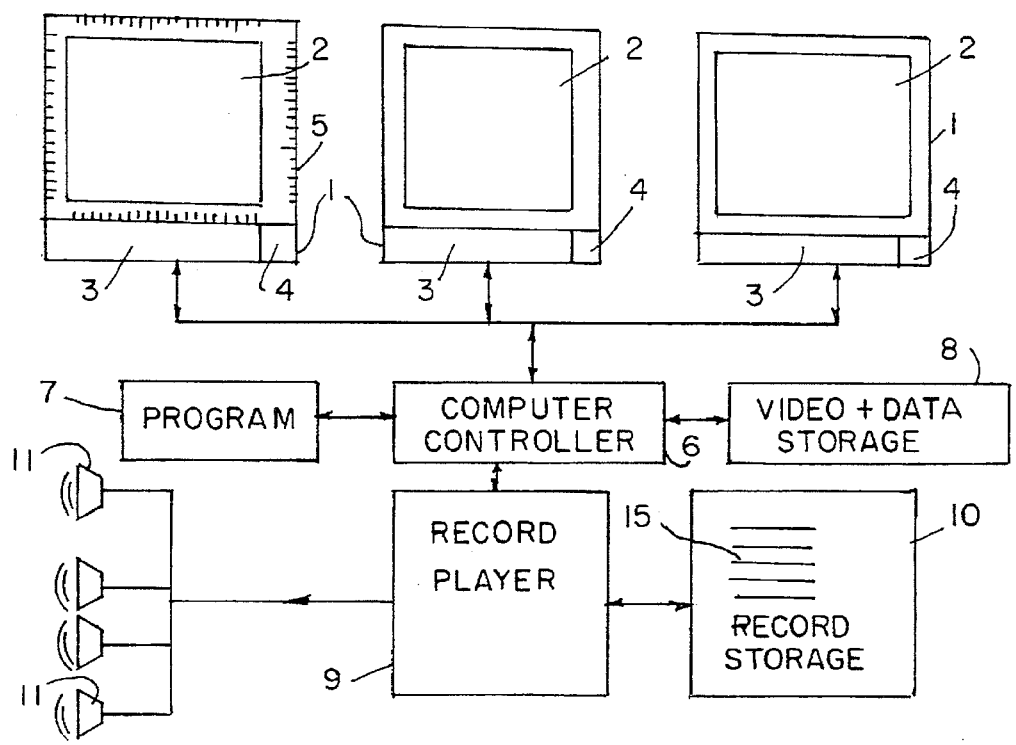
FIG. 1 illustrates diagrammatically an apparatus of the invention.

Referring now first to FIG. 1, there is shown an apparatus for playing recordings in which the audience preferences are carefully considered by an automatic mechanism in selecting which musical numbers are to be played and when they are to be played. At least one, and preferably many, audience operated terminals 1 have a video display 2 and operator control means which may include a keyboard 3, a mouse 4, and, preferably a touch panel 5 which may be any one of the well known devices which signals to a computer by touching or pointing to a location on the display. These are easiest for the untrained public to operate. The terminals are connected to a computer 6 supplied with a program 7 and a video and data storage 8. Also connected to the computer are a player mechanism 9 for playing records or recordings 15 stored in record storage 10 and converting the recordings into audio played on one or more loudspeakers 11 for audience enjoyment. The records or recordings hereinafter referred to as record unit may be in the form of grooved vinyl discs, tape, optical discs or other recording media well known in the art. The player mechanism may include means for selecting one record unit from a large number of units and locating a position on the record unit where a particular musical number or selection is located. These mechanisms are well known in the art of jukeboxes and related apparatus.

Stored in video and data storage means 8 are the relevant information about the musical numbers or recorded selections including which record unit contains it and where on the record unit the recorded selection begins and ends. Also included with that data are the information, both text and graphic, that are found on the record, jacket, album cover and the like hereinafter referred to as album cover that are displayed to the potential purchaser of the record unit to disclose details of the recorded numbers and attractive graphic illustrations to aid in the selection.

This information is transferred from video and data storage 8 through computer controller 6 to the display terminals to aid the audience in their process of selecting numbers to be heard.

Figure 2:
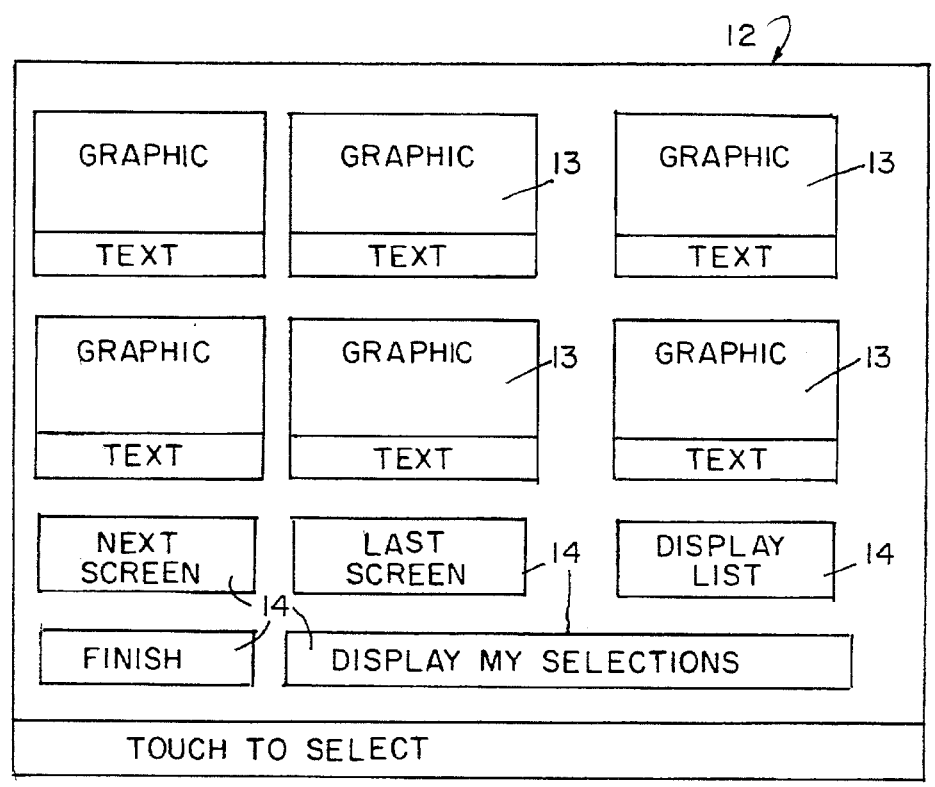
FIG. 2 is a representative screen display for user selection.
Figure 3:
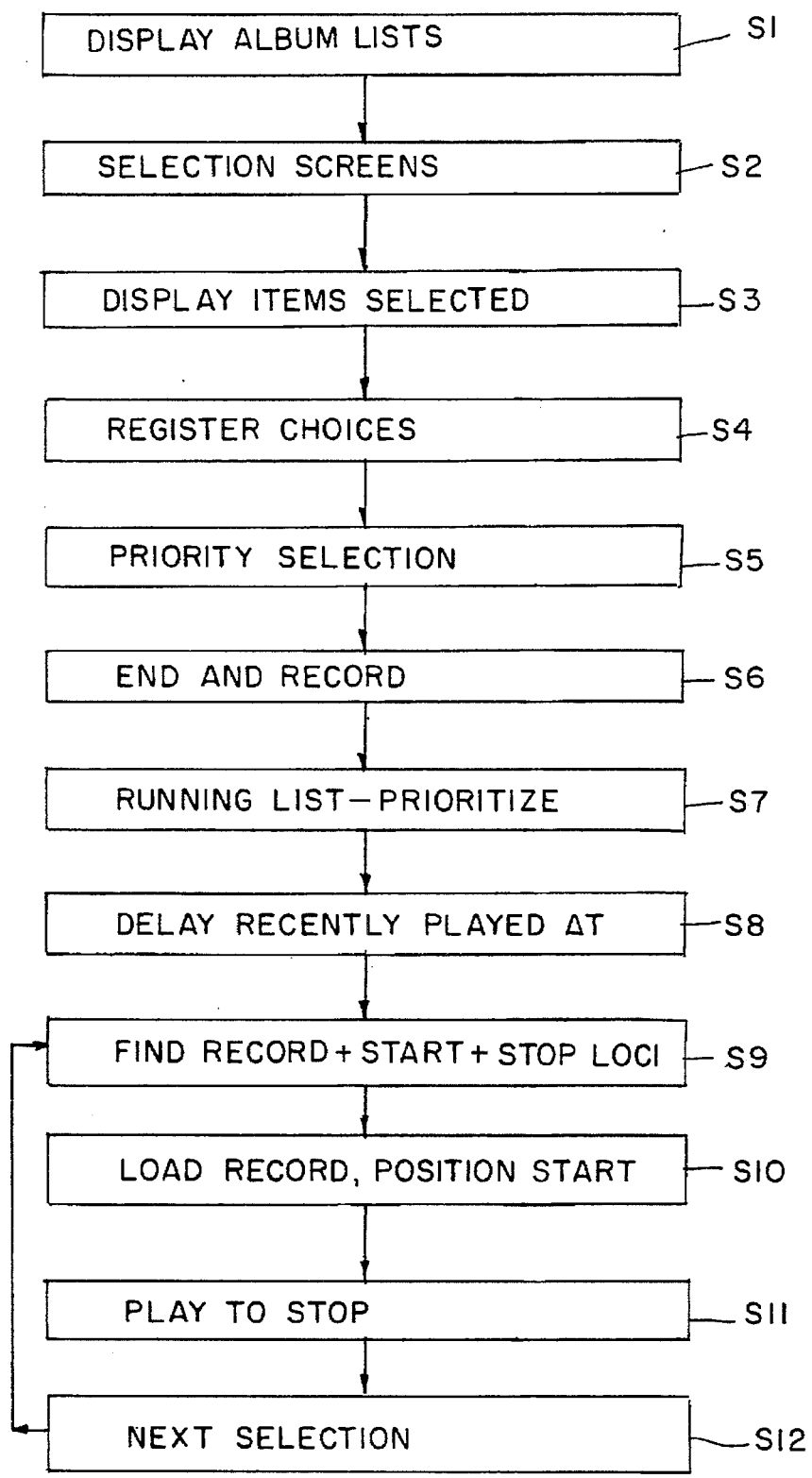
FIG. 3 is a generalized flow chart of the operation of the invention.

Referring now to FIG. 2, a representative screen 12 displaying information from video and data storage 8 on terminal 1 as shown. One or more record covers 13 is displayed on the screen 12 at one time, with areas 14 to touch or point to, so called "virtual buttons", to communicate with the system for selecting particular performances to be played. As best seen in FIG. 3, the selection process may begin with simple lists of performances from which the user selects the more detailed display with album covers or a better educated and more pleasant selection process. The user may also indicate priority of the choices made on another screen at the end of the selection process.

The data on choices made and the address of each choice and any priority of choices are communicated to computer 6. The computer combines the data with earlier made choices and maintains a continuously updated list of choices in the order of popularity which becomes the playlist and schedule of playing of the selected recordings. However, a record is also maintained of the selections played in the recent past and a delay interval of a preset time is imposed on any choice already played so that the audience will not be forced to listen to very popular recordings very often.

Because the system provides video terminals that will be unused except when making selections, other video materials such as advertisements, games and the like may be stored in storage 8 and or transmitted by cable from elsewhere may be economically incorporated into the system to enhance value and provide a screen saver.

The generalized flow chart of the operation of the invention, as shown in FIG. 3, comprises the steps of:

S1, displaying lists of albums or items from which more detailed information is requested by touching an item on the list;

S2, displaying a screen such as shown in FIG. 2 with graphics and some text of a item touched on list in step s1 along with additional items. The user may browse through many such screens by touching "next screen" of FIG. 2 and may touch an item to select it for detailed display;

S3, displaying detailed information of an item selected in step s2;

S4, user chooses the item for play if desired after viewing in step. s3 and the choice is registered in memory, by touching a virtual button, and may return to earlier steps for additional items;

S5, after all choices have been made, the choices are displayed and user indicates the desired order of playing;

S6, the items selected and the desired order are recorded in the computer;

S7, the selected list of items and order of play are combined with lists recorded earlier to generate a continuously updated play list of items to be played;

S8, when it is time to play a particular item on the list, the computer compares that item with a list of recently played items, and delays the playing of that particular item if it has been played within a preset time interval by modification of the playlist to play it later in the sequence;

S9, the computer finds the recording and the loci on the recording for the next item on the play list;

S10, the recording is loaded and player positioned on the recording at the start locus of the item to be played;

S11, the recording is played to the stop locus;

S12, when the stop locus is reached, the system returns to step S9 to play the next item on the play list or stops if there are no more items on the play list.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A system for audience controlled playing of audio recordings comprising:

at least one terminal to be operated by operators who are members of the audience;

the terminal having a video display and means for operator control of information displayed and recorded performances to be played;

a computer controller connected to the at least one terminal;

a program means connected to the controller for enabling operation of the controller;

record storage means for storing record units, the record units containing the recorded performances;

a record player connected to the record storage means for manipulating and playing the recorded performances;

loudspeakers connected to the record player for emitting audible signals derived from the recorded performances played on the record player, the record player being operatively connected to the computer controller;

a video and data storage means storing data and video information on each of the recorded performances contained on the record units, the data including stop and start addresses, text, and graphics from the album cover for each recorded performance, the video and data storage means being operatively connected to the computer controller;

the system adapted for displaying album covers under operator control and registering operator's choices on the at least one terminal; and the program means enabling the system to prepare a continuously updated playlist whose order of playing is based upon the order of selections, the number of times a performance has been selected, and a delay of a minimum preset time interval between repeated playings of said performance and then enabling the record player to play the recorded performance later in the sequence.

2. The system according to claim 1 further comprising means for displaying alternative information unrelated to the recorded performances on the at least one terminal when the terminals are not being used for selection of recorded performances, the alternative information including advertisements and games.

3. The system according to claim 2, in which the at least one terminal is provided with a touch panel means for operator control.

4. The system according to claim 1, in which the at least one terminal is provided with a touch panel means for operator control.

* * * * *